US012215660B2

(12) United States Patent
Bouzmane

(10) Patent No.: US 12,215,660 B2
(45) Date of Patent: Feb. 4, 2025

(54) HYBRID ELECTRIC HYDRAULIC MOTOR SYSTEM FOR VEHICLES

(71) Applicant: Mohammed Bouzmane, Columbus, OH (US)

(72) Inventor: Mohammed Bouzmane, Columbus, OH (US)

( * ) Notice: Subject to any disclaimer, the term of this patent is extended or adjusted under 35 U.S.C. 154(b) by 1049 days.

(21) Appl. No.: 16/296,518

(22) Filed: Mar. 8, 2019

(65) Prior Publication Data

US 2020/0284233 A1    Sep. 10, 2020

(51) Int. Cl.
*F02N 7/06*     (2006.01)
*B60L 50/50*    (2019.01)
(Continued)

(52) U.S. Cl.
CPC .............. *F02N 7/06* (2013.01); *B60L 50/50* (2019.02); *B60W 30/18127* (2013.01); *F04B 35/002* (2013.01)

(58) Field of Classification Search
CPC .... F02N 7/06; B60L 50/50; B60W 30/18127; F04B 35/002
See application file for complete search history.

(56) References Cited

U.S. PATENT DOCUMENTS 5,097,857 A * 3/1992 Mayhew ................. F15B 21/08
                                                            60/394
5,969,302 A * 10/1999 Nishizawa ............ B60P 1/4471
                                                            414/556

(Continued)

Primary Examiner — Gertrude Arthur JeanGlaude
(74) Attorney, Agent, or Firm — MIP Legal, Ltd.; Bryce D. Miracle, Esq.

(57) ABSTRACT

The disclosure pertains to a hybrid electric hydraulic motor system for a vehicle that has a propulsion mode and a decelerating mode. The propulsion mode has an ignition stage and a drive stage. The system generally includes one or more batteries for storing electricity; an electric motor operably connected to the battery; an internal combustion engine; a vehicle hydraulic system; a first hydraulic pump operably connected to the electric motor for producing hydraulic pressure; a first hydraulic motor operably connected between the first hydraulic pump and the internal combustion engine; a timer valve operably connected between the first hydraulic pump and the first hydraulic motor; a second hydraulic pump operably connected to the internal combustion engine for producing hydraulic pressure; a hydraulic reservoir for storing hydraulic liquid operably connected to the first hydraulic pump, the second hydraulic pump, and the third hydraulic pump; a second hydraulic motor operably connected to the first and second hydraulic pumps; and a motive device operably connected to the second hydraulic motor. While in the ignition stage, the battery provides electricity to drive the electric motor that drives the hydraulic pump that provides hydraulic pressure to the first hydraulic motor that operates to start the internal combustion engine, wherein after ignition of the internal combustion engine, the timer valve operates to discontinue hydraulic pressure between the first hydraulic pump and the second hydraulic pump. While in the drive stage, the internal combustion engine operates to drive the second hydraulic pump, wherein the first hydraulic pump and the second hydraulic pump operably combine to supply the second hydraulic motor with hydraulic pressure to drive the motive device.

12 Claims, 4 Drawing Sheets

(51) Int. Cl.
  *B60W 30/18* (2012.01)
  *F04B 35/00* (2006.01)

(56) References Cited

U.S. PATENT DOCUMENTS

| | | | |
|---|---|---|---|
| 6,376,927 B1 * | 4/2002 | Tamai | B60K 6/383 |
| | | | 290/31 |
| 2012/0056471 A1 * | 3/2012 | Plewnia | B60T 13/586 |
| | | | 303/3 |

* cited by examiner

HYBRID ELECTRIC HYDRAULIC MOTOR SYSTEM FOR VEHICLES

FIELD OF THE INVENTION

The present invention pertains to an electric hydraulic motor system for providing propulsion and braking during the operation of a vehicle such as an airplane, off-road and on-the-road vehicles, trains, and shipping vessels.

SUMMARY

A hybrid electric hydraulic motor and braking system for vehicles is provided. Generally, the system provides propulsion and/or braking for vehicles such as on-the-road vehicles, off-road vehicles, aircraft, trains, and/or shipping vessels.

In a version of the application, the hybrid electric hydraulic motor system for a vehicle has a propulsion mode. The propulsion mode has an ignition stage and a drive stage. The system generally comprises: one or more batteries for storing electricity; an electric motor operably connected to the battery; an internal combustion engine; a vehicle hydraulic system; a first hydraulic pump operably connected to the electric motor for producing hydraulic pressure; a first hydraulic motor operably connected between the first hydraulic pump and the internal combustion engine; a timer valve operably connected between the first hydraulic pump and the first hydraulic motor; a second hydraulic pump operably connected to the internal combustion engine for producing hydraulic pressure; a hydraulic reservoir for storing hydraulic liquid operably connected to the first hydraulic pump, the second hydraulic pump, and the third hydraulic pump; a second hydraulic motor operably connected to the first and second hydraulic pumps; and a motive device operably connected to the second hydraulic motor.

While in the ignition stage of the propulsion mode of the system, the battery provides electricity to drive the electric motor that drives the hydraulic pump that provides hydraulic pressure to the first hydraulic motor that operates to start the internal combustion engine, wherein after ignition of the internal combustion engine, the timer valve operates to discontinue hydraulic pressure between the first hydraulic pump and the second hydraulic pump.

While in the drive stage of the propulsion mode and after the ignition of the internal combustion engine, the internal combustion engine operates to drive the second hydraulic pump, wherein the first hydraulic pump and the second hydraulic pump operably combine to supply the second hydraulic motor with hydraulic pressure to drive the motive device.

In another version of the application, the system may further a decelerating mode having a shut-off stage and a regenerative braking stage. The version further includes a shut-off system operably connected to the internal combustion engine and the electric motor; a third hydraulic pump operably connected to the motive device for producing hydraulic pressure; and a hydraulic accumulator for storing hydraulic pressure operably connected to the third hydraulic pump. Wherein while in the shut-off stage of the decelerating mode, the shut-off system terminates the operation of both the internal combustion engine and the electric motor, and wherein while in the regenerative braking stage of the decelerating mode, the motive device drives the third hydraulic pump that produces hydraulic pressure that is stored for future use in the accumulator.

In other versions of the application, the hybrid electric hydraulic system may include a vehicle brake input operably connected to the hydraulic pressure of the vehicle hydraulic system, and the vehicle brake input provides operator input to decelerate the vehicle.

In yet another version, the hybrid electric hydraulic system may include a vehicle direction input that is operably connected to the hydraulic pressure produced by the system. The vehicle direction input allows the selection of the direction of the vehicle in the forward or reverse direction.

In a certain version, the hybrid electric hydraulic system may further comprise a second hydraulic accumulator operably connected downstream of the first and second hydraulic pumps for storing hydraulic pressure for future use.

Yet other versions of the system may comprise an array of solar panels operably connected to the one or more batteries for producing electricity to be stored in the battery and/or a hydrogen fuel cell for providing electrical energy to either the battery for storage or is operably connected directly to the electric motor.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. The hydraulic hybrid vehicle system may, however, be embodied in many different forms and should not be construed as being limited to the embodiments set forth herein; rather, these embodiments are provided by way of illustration only so that this disclosure will be thorough, complete and fully convey understanding to those skilled in the art.

BRIEF DESCRIPTION OF THE DRAWINGS

These and other features, aspects, and advantages of the present invention will become better understood with regard to the following description, appended claims, and accompanying drawings where:

DESCRIPTION

In the following description, for purposes of explanation and not limitation, specific details are set forth, such as particular architectures, interfaces, techniques, etc., in order to provide a thorough understanding of the present invention. However, it will be apparent to those skilled in the art that the present invention may be practiced in other versions that depart from these specific details. In other instances, detailed descriptions of well-known devices and methods are omitted so as not to obscure the description of the present invention with unnecessary detail.

Moreover, the description is not to be taken in a limiting sense but is made merely for the purpose of illustrating the general principles of the invention since the scope of the invention is best defined by the appended claims. Various inventive features are described below that can each be used independently of one another or in combination with other features.

Unless otherwise defined, all technical terms used herein have the same meaning as commonly understood by one of ordinary skill in the art to which the invention belongs. As used in the specification and the appended claims, the singular forms "a," "an," and "the" include plural references unless the context clearly dictates otherwise. Any reference to "or" herein is intended to encompass "and/or" unless otherwise stated.

Figure 1:
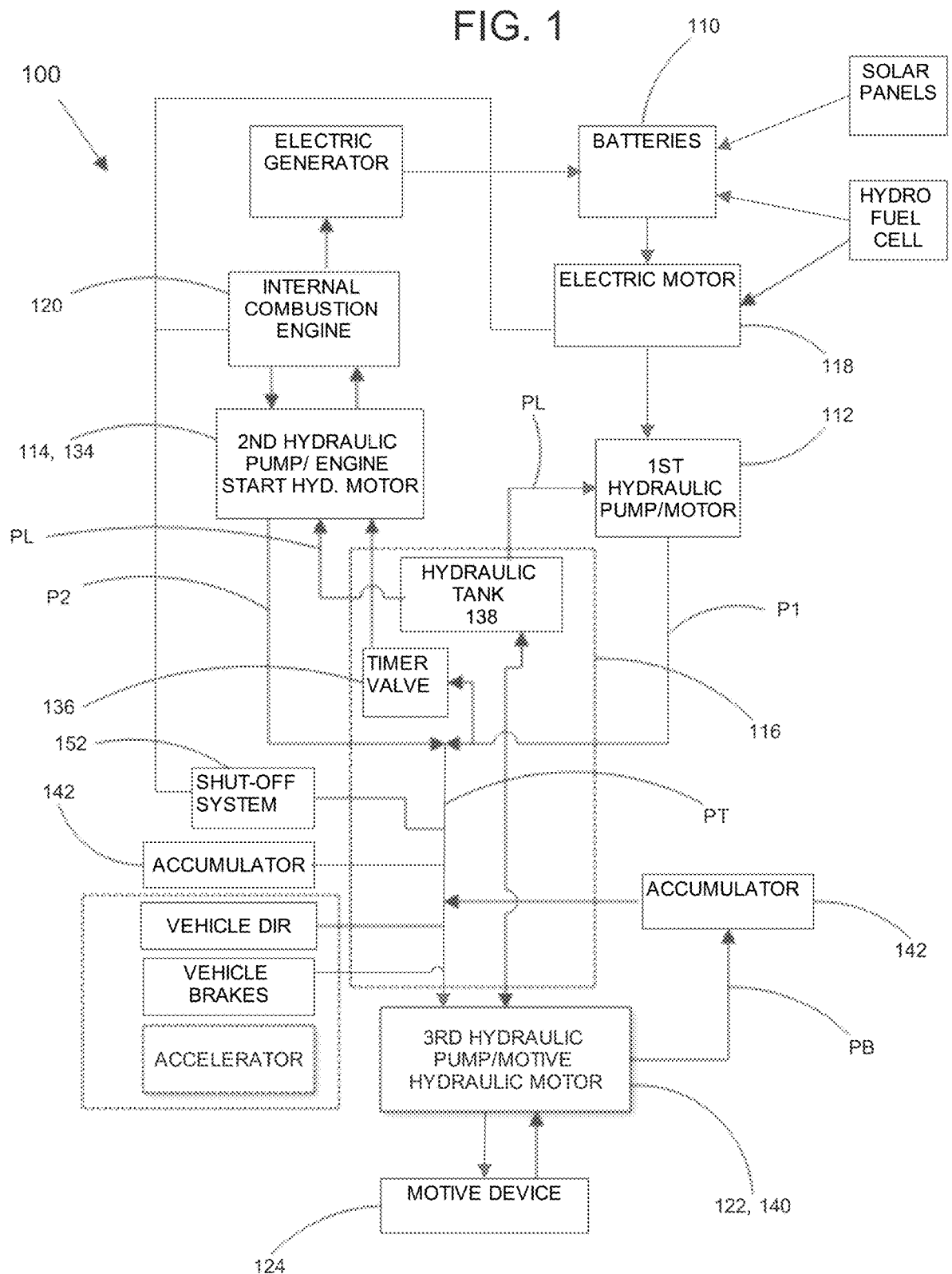
FIG. 1 is a schematic view of a first version of the system of the present invention.
Figure 2:
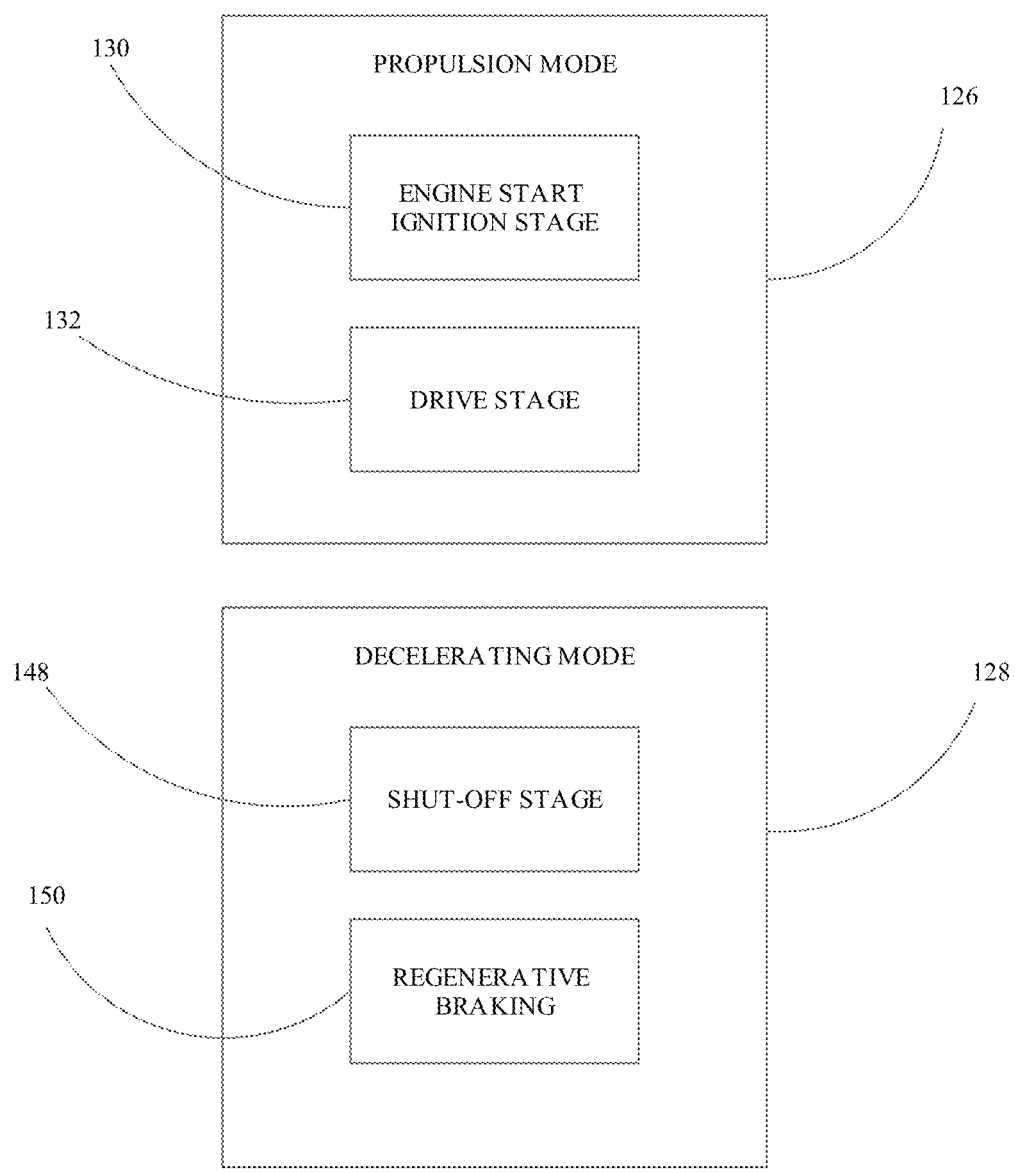
FIG. 2 is a box diagram of the operating modules of the first version of the application.

With reference now to FIG. 1 and FIG. 2, a hybrid electric hydraulic motor system for vehicles having a propulsion mode 126 and a decelerating mode 128 is provided, which embodies the concepts of the present invention and is generally designated by the reference numeral 100. A vehicle, as defined herein, can be any current and future form of transport that moves between two or more points. The forms of transport may or may not be designed to carry human beings. For example, the electric hydraulic motor system 100 may be operably integrated with on-road and off-road vehicles, trucks, aircraft, trains, boats, and shipping vessels.

FIG. 1 is a schematic view of a first version of the electric hydraulic motor system for vehicles, particularly suited for on and off-road vehicles. As illustrated, the system 100 generally comprises a first hydraulic pump 112 driven by an electric motor 118 and a second hydraulic pump 114 driven by an internal combustion engine 120. The first and second hydraulic pumps 112 and 114 combine to produce hydraulic pressure $P_1+P_2=P_T$ within the vehicle hydraulic system 116. The system 100 further comprises a motive device hydraulic motor 122 or second hydraulic motor that is powered by the vehicle hydraulic system 116 total pressure $P_T$ that operates to mechanically drive the motive device 124 that imparts mechanical movement to the vehicle. The motive device 124 can be one or more vehicle wheels, aircraft propellers, ship or boat propellers, or any other mechanical means of propulsion.

Referring to FIG. 1, the vehicle hydraulic system 116 generally comprises a hydraulic tank or hydraulic reservoir 138 for storing hydraulic fluid, the hydraulic lines connecting the first, second, and third hydraulic pumps 112, 114, and 140, the engine start hydraulic motor 134, the motive device hydraulic motor 122, the first and second accumulators 142, 144, and vehicle controls 146.

As illustrated by FIG. 2, the version 100 generally comprises a propulsion mode 126 and a decelerating mode 128. The propulsion mode 126 comprises an ignition stage 130 and a drive stage 132. Generally, the ignition stage 130 includes operation to start the internal combustion engine 120 utilizing the hydraulic system 116 and battery 110 of the vehicle. The drive stage 132 generally operates by using both the electric motor 118 and the internal combustion engine 120 to produce combined hydraulic pressure Pt within the vehicle hydraulic system 116 to drive the motive device 124.

In further detail and now referring back to FIG. 1, while in the ignition stage 130, the version 100 of the system further comprises an engine start hydraulic motor 134 operably connected to the internal combustion engine 120, the vehicle hydraulic system 116, and the first hydraulic pump 112. In the version, a timer valve 136 is operably positioned between the hydraulic motor 134 and the first hydraulic pump 114. Thus, during the ignition stage 130, the battery 110 provides power to the electric motor 118 that drives the first hydraulic pump 112 that provides hydraulic pressure $P_1$ to the vehicle hydraulic system 116. Initially, the timer valve 136 is opened, allowing hydraulic pressure to flow to the engine start hydraulic motor 134, which operates to start the internal combustion engine 120. After ignition of the internal combustion engine 120, the timer valve 126 actively closes and discontinues hydraulic pressure $P_1$ between the first hydraulic pump 112 and the engine start hydraulic motor 134.

In certain versions of the system 100, the hydraulic reservoir 138 may provide a low pressure $P_L$ to assist the first hydraulic pump 112 in providing pressure to the engine hydraulic motor 134 throughout the ignition stage 130.

After the ignition of the internal combustion engine 120 and closure of the timer valve 136 during the ignition stage 130, the system 100 transitions to the drive stage 132 of the propulsion mode 126. As described above, the battery 110 powers the electric motor 118 that drives the first hydraulic pump 112 that produces a first amount of pressure $P_1$ within the vehicle hydraulic system 116, and the internal combustion engine 120 operates to drive the second hydraulic pump 114 to produce a second amount of pressure $P_2$ within the vehicle hydraulic system 116. The first and second hydraulic pressures $P_1$ and $P_2$ are combined to achieve hydraulic pressure Pt that is supplied to the motive device hydraulic motor 122 that in turn drives the motive device 124 or wheels of the vehicle.

In certain versions, hydraulic pumps 112, 114, and 140 are interchangeable with the hydraulic motors 122, and 134 depending on the directional flow of the hydraulic pressure. Thus, hydraulic pump 114 and the engine start hydraulic motor 134 are the same device, and hydraulic pump 140 and the motive device hydraulic motor 122 are the same device, the direction of the hydraulic pressure determining the type of operation.

In certain versions of the system 100, the hydraulic reservoir 138 may provide a low pressure $P_L$ to assist both the first and second hydraulic pump 112, 114 for producing the $P_T$ pressure that is supplied to the hydraulic system 116 and the motive device hydraulic motor 122 to drive the motive device 124 throughout the drive stage 132.

In a version, a first hydraulic accumulator 142 may be operably connected to the hydraulic system 116, which operates to store excess hydraulic pressure $P_T$ for future use and to cope with extremes of demand using a less powerful pump, to respond more quickly to a temporary demand, and to smooth out pulsations. The first hydraulic accumulator 142 may be operably positioned downstream of the first and second hydraulic pumps 112, and 114 for storing hydraulic pressure for future use.

Figure 4:
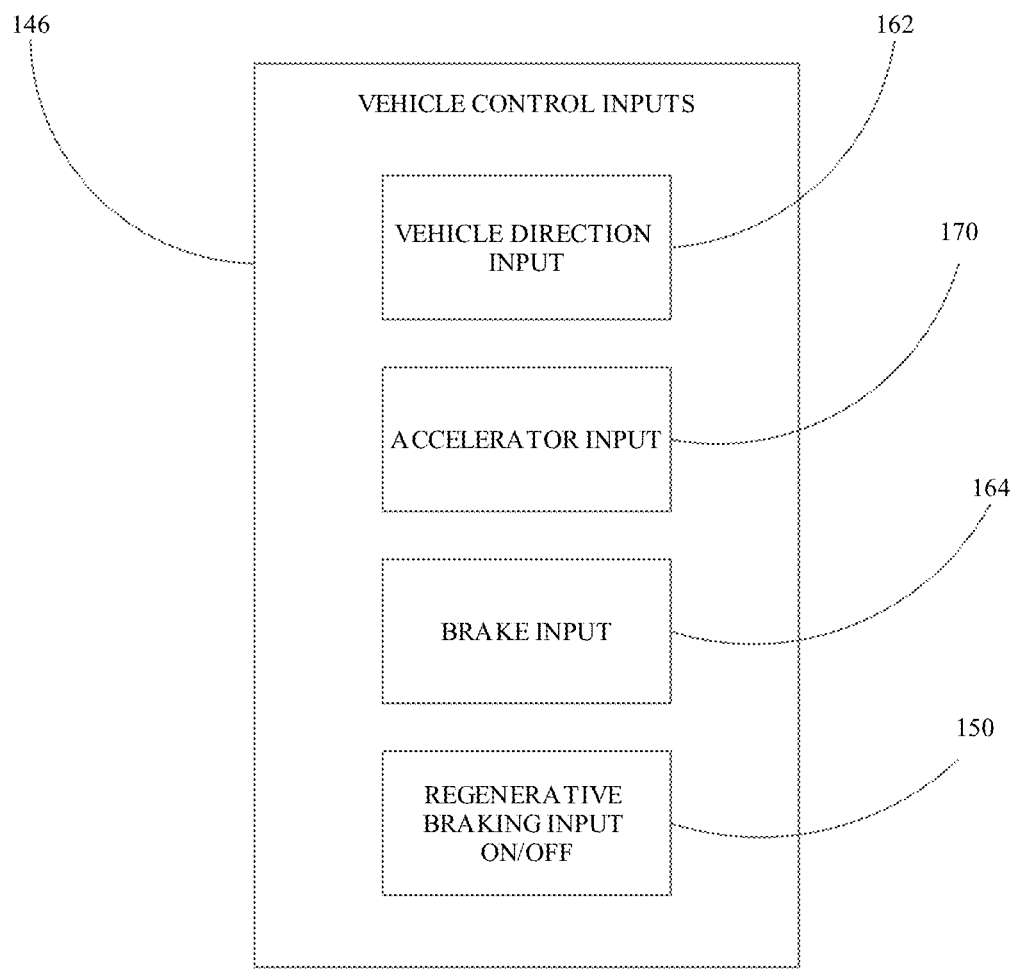
FIG. 4 is a schematic view of a second version of the system of the present invention.

Referring to FIG. 4, the system 100 may further integrate vehicle controls 146 that operate from low pressure derived from the hydraulic system 116. The vehicle controls 146 may include a vehicle direction input 162 regarding operator selection of the direction of the vehicle such as forward and reverse. Further, the vehicle controls 146 may include a brake input 164 for the operator to decelerate the vehicle. Further vehicle controls may include an accelerator input 170 such as a throttle, gas pedal, lever, or equivalent in order to engage the system 100 into the propulsion mode 126, thereby starting the electric motor 118 and internal combustion engine 120 actuating the motive device 124.

In certain versions of the electric hydraulic system 100, the vehicle hydraulic system 100 may utilize check valves 117 that only allow the hydraulic pressure within the hydraulic system 116 to move in one direction. Preferably, check valves 117 are two-port valves, meaning they have two openings in the body, one for fluid to enter and the other for fluid to leave.

As illustrated in FIG. 2, in certain versions of the application, the electric hydraulic system 100 may further include a decelerating mode 128 which may comprise a shut-off stage 148 for turning off the internal combustion engine 120 and the electric motor 118 in order to cease producing hydraulic pressure $P_1$, $P_2$ to the vehicle hydraulic system 116, and a regenerative braking stage 150 for providing a mechanism which slows the vehicle by converting vehicle kinetic motion into hydraulic pressure.

Referring to FIG. 1, the shut-off stage 148 of a version of the electric hydraulic system 100 further comprises a shut-off system 152 that operably connects the vehicle hydraulic system 116, the vehicle brakes 164, and to the ignition system of both the internal combustion engine 120 and the electric motor 118. The shut-off system 152 is configured to detect an increased predetermined amount of pressure within the vehicle hydraulic system 116, indicating that the vehicle motive device 124 is no longer engaged and that the vehicle is decelerating and transitioning into the decelerating mode 128. In a version of the system 100, once the pressure increase threshold is observed by the shut-off system 152, the shut-off system 152 operably discontinues electric power to the ignition of the electric motor 118 and the internal combustion engine 120. Therefore, terminating the production of further hydraulic pressure generated by the internal combustion engine 120 and the electric motor 118 to the vehicle hydraulic system 116 via hydraulic pumps 112, 114. Thus minimizing energy expenditure while the vehicle is decelerating and not being required to propel the vehicle. After that, when the vehicle is caused to transition to the propulsion stage 130 by engagement of the motive device 124, for example, engaging the accelerator input 170 such as a throttle or gas pedal, the vehicle hydraulic system 116 observes a decrease in pressure. When the pressure decreases below a predetermined threshold, the shut-off system 152 is operably configured to recontinue the operation of the ignition of both the electric motor 118 and the internal combustion engine 120, allowing them to operate to produce hydraulic pressure within the vehicle hydraulic system 116.

In a certain version of the application, the shut-off system 152 comprises a spring valve that is configured to move to a first position (upward) when an increased pressure threshold is observed, thus triggering the shut-off system 152 to discontinue operation of the ignition of each of the electric motor 118 and the internal combustion engine 120. In the opposite manner, the spring valve is configured to move to a second position (downward) when a decreased pressure threshold is observed, thus triggering the shut-off system 152 to recontinue the operation of the ignition system of both the internal combustion engine and the electric motor (See FIG. 1).

In a version of the application, the version 100 may include a regenerative braking stage 150 implemented while the vehicle brakes 164 are applied and/or while the vehicle is caused to decelerate. The version of the system 100 further comprises a third hydraulic pump 140 and a second hydraulic accumulator 142. The second hydraulic accumulator 142 is operatively configured to store hydraulic pressure for future use, produced during the regenerative braking stage 150. Wherein while the vehicle decelerates, the motive device 124, i.e., vehicle wheels or propeller, kinetic mechanical energy to drive the third hydraulic pump 140 that produces hydraulic pressure $P_B$ that is stored in the second accumulator 142 for future use. Thus, the kinetic motion of the moving vehicle is used to store energy while simultaneously decelerating the vehicle. In certain versions, the hydraulic reservoir 138 provides a low hydraulic pressure combined with the hydraulic pressure produced by the third hydraulic pump 140 to produce pressure $P_B$.

Figure 3:
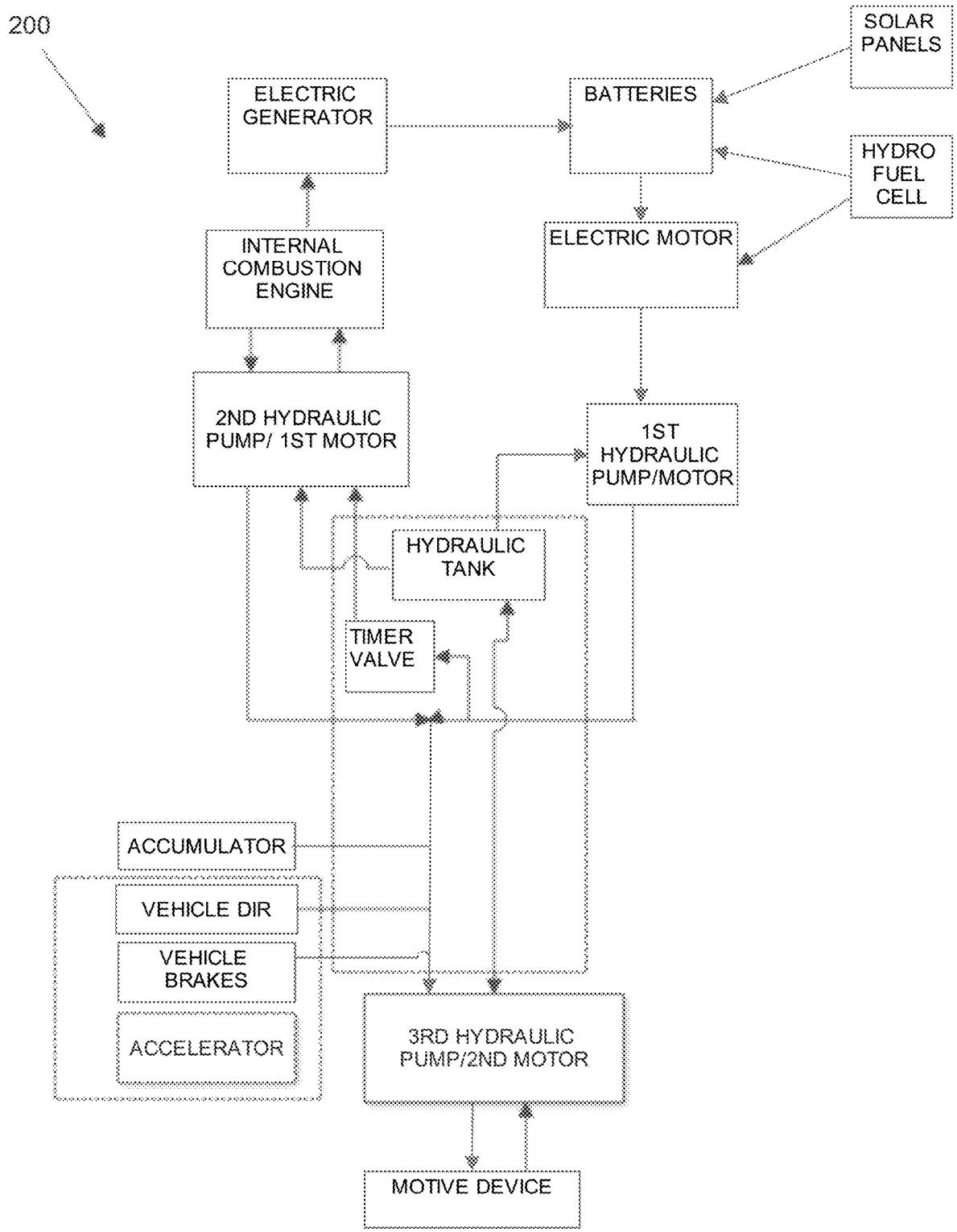
FIG. 3 is a box diagram of the vehicle inputs of a version of the application.

FIG. 3 illustrates a version 200 of the hydraulic electric system that does not have a regenerative braking function. The version 200 may be best suited for aircraft, ships, and other vehicles that do not have a braking input.

Preferably, the batteries 110 utilized in the electric hydraulic system 100 is are rechargeable batteries such as lithium ion. A single battery unit can be utilized, or multiple batteries can be utilized in parallel or series to provide a battery bank for storing electrical power.

In certain versions of the application, alternative power sources may be utilized to drive the electric motor 118 or provide a charge to the batteries 110. As illustrated in FIG. 1, the electric hydraulic system 100 may further comprise a hydrogen fuel cell 158 that is operatively connected directly to the electric motor 118 or the batteries 110. Alternatively, other sources of power, particularly clean energy solutions, may be utilized, such as a solar panel array 160 operably connected to charge batteries 110.

The previously described versions of the present invention have many advantages, including providing an economical system that reduces the need for fossil fuels and lowers emissions and noise pollution.

The disclosures of the following U.S. patents are incorporated in their entirety by reference herein: U.S. Pat. Nos. 5,311,973; 4,007,817; 5,839,554; 9,351,359; 5,415,603; 7,237,634; 6,644,427; 8,079,437; 4,593,779; 6,330,498; 8,118,253; 8,016,228; 4,759,178; 5,494,075; 7,112,910; 5,404,859, and 5,609,145.

Although preferred versions of the invention have been described in considerable detail, other versions of the invention are possible.

All the features disclosed in this specification (including any accompanying claims, abstract, and drawings) may be replaced by alternative features serving the same, equivalent or similar purpose unless expressly stated otherwise.

What is claimed is:

1. An electric hydraulic motor system for vehicles having a propulsion mode, the propulsion mode having an ignition stage and a drive stage, the system comprising:
   one or more batteries for storing electricity;
   an electric motor operably connected to the battery;
   an internal combustion engine;
   a vehicle hydraulic system;
   a first hydraulic pump operably connected to the electric motor for producing hydraulic pressure;
   a first hydraulic motor operably connected between the first hydraulic pump and the internal combustion engine;
   a timer valve operably connected between the first hydraulic pump and the first hydraulic motor;
   a second hydraulic pump operably connected to the internal combustion engine for producing hydraulic pressure;
   a hydraulic reservoir for storing hydraulic liquid operably connected to the first hydraulic pump, the second hydraulic pump, and the third hydraulic pump;
   a second hydraulic motor operably connected to the first and second hydraulic pumps; and
   a motive device operably connected to the second hydraulic motor;
wherein while in the ignition stage, the battery provides electricity to drive the electric motor that drives the hydraulic pump that provides hydraulic pressure to the first hydraulic motor that operates to start the internal combustion engine, wherein after ignition of the internal combustion engine, the timer valve operates to discontinue hydraulic pressure between the first hydraulic pump and the second hydraulic pump;

wherein while in the drive stage of the internal combustion engine, the internal combustion engine operates to drive the second hydraulic pump, wherein the first hydraulic pump and the second hydraulic pump operably combine to supply the second hydraulic motor with hydraulic pressure to drive the motive device.

2. The system of claim 1, further comprising a vehicle brake input operably connected to the hydraulic pressure of the vehicle hydraulic system, the vehicle brake input provides operator input to decelerate the vehicle.

3. The system of claim 2, further comprising a vehicle direction input operably connected to the hydraulic pressure produced by the system, the vehicle direction input allows selection of the direction of the vehicle in the forward or reverse direction.

4. The system of claim 1, further comprising a second hydraulic accumulator operably connected downstream of the first and second hydraulic pumps for storing hydraulic pressure for future use.

5. The system of claim 4, further comprising an array of solar panels operably connected to the one or more batteries for producing electricity to be stored in the battery.

6. The system of claim 1, further comprising a hydrogen fuel cell for providing electrical energy to either the battery for storage or operably connected directly to the electric motor.

7. An electric hydraulic motor system for vehicles having a propulsion mode and a decelerating mode, the propulsion mode having an ignition stage and a drive stage, the system comprising:
   one or more batteries for storing electricity;
   an electric motor operably connected to the battery;
   an internal combustion engine;
   a vehicle hydraulic system;
   a first hydraulic pump operably connected to the electric motor for producing hydraulic pressure;
   a first hydraulic motor operably connected between the first hydraulic pump and the internal combustion engine;
   a timer valve operably connected between the first hydraulic pump and the first hydraulic motor;
   a second hydraulic pump operably connected to the internal combustion engine for producing hydraulic pressure;
   a hydraulic reservoir for storing hydraulic liquid operably connected to the first hydraulic pump, the second hydraulic pump, and the third hydraulic pump;
   a second hydraulic motor operably connected to the first and second hydraulic pumps;
   a motive device operably connected to the second hydraulic motor;
   a shut-off system operably connected to the internal combustion engine and the electric motor;
   a third hydraulic pump operably connected to the motive device for producing hydraulic pressure;
   a hydraulic accumulator for storing hydraulic pressure operably connected to the third hydraulic pump;
   wherein while in the ignition stage, the battery provides electricity to drive the electric motor that drives the hydraulic pump that provides hydraulic pressure to the first hydraulic motor that operates to start the internal combustion engine, wherein after ignition of the internal combustion engine, the timer valve operates to discontinue hydraulic pressure between the first hydraulic pump and the second hydraulic pump;
   wherein while in the drive stage of the internal combustion engine, the internal combustion engine operates to drive the second hydraulic pump, wherein the first hydraulic pump and the second hydraulic pump operably combine to supply the second hydraulic motor with hydraulic pressure to drive the motive device;
   wherein while in the shut-off stage of the decelerating mode, the shut-off system terminates operation of both the internal combustion engine and the electric motor;
   wherein while in the regenerative braking stage of the decelerating mode, the motive device drives the third hydraulic pump, which produces hydraulic pressure that is stored for future use in the accumulator.

8. The system of claim 7, further comprising a vehicle brake input operably connected to the hydraulic pressure of the vehicle hydraulic system, the vehicle brake input provides operator input to decelerate the vehicle.

9. The system of claim 7, further comprising a vehicle direction input operably connected to the hydraulic pressure produced by the system, the vehicle direction input allows selection of the direction of the vehicle in the forward or reverse direction.

10. The system of claim 7, further comprising a second hydraulic accumulator operably connected downstream of the first and second hydraulic pumps for storing hydraulic pressure for future use.

11. The system of claim 7, further comprising an array of solar panels operably connected to the one or more batteries for producing electricity to be stored in the battery.

12. The system of claim 7, further comprising a hydrogen fuel cell for providing electrical energy to either the battery for storage or operably connected directly to the electric motor.

* * * * *